United States Patent [19]

Peska et al.

[11] Patent Number: 4,794,177

[45] Date of Patent: Dec. 27, 1988

[54] METHOD FOR THE PRODUCTION OF BEAD DEXTRAN MATERIALS FOR GEL CHROMATOGRAPHY

[75] Inventors: Jan Peska; Jiri Lenfeld; Zedenek Plichta; Milan Benes, all of Prague; Frantisek Svec, Hrebec; Jiri Coupek, Prague, all of Czechoslovakia

[73] Assignee: Ceskoslovenska akademie ved, Czechoslovakia

[21] Appl. No.: 809,929

[22] Filed: Dec. 16, 1985

[30] Foreign Application Priority Data

Dec. 29, 1984 [CS] Czechoslovakia ............... 10609-84

[51] Int. Cl.$^4$ .............. C08B 37/02; B01D 15/08; C02F 1/28
[52] U.S. Cl. .................................. 536/112; 210/656
[58] Field of Search ..................... 536/112; 210/656

[56] References Cited

U.S. PATENT DOCUMENTS

| 3,865,807 | 2/1975 | Narang et al. ............ 536/112 |
| 4,293,654 | 10/1981 | Levine et al. ............ 536/112 |
| 4,446,316 | 5/1984 | Chazov et al. ........... 536/112 |
| 4,474,663 | 10/1984 | Nakajima et al. ......... 210/656 |
| 4,507,472 | 3/1985 | Usher et al. ............. 536/112 |
| 4,591,638 | 5/1986 | Ahrgren et al. .......... 536/112 |

FOREIGN PATENT DOCUMENTS

| 66135 | 12/1982 | European Pat. Off. ......... 536/112 |
| 1292883 | 4/1959 | Fed. Rep. of Germany . |
| 974054 | 11/1964 | United Kingdom . |
| 1087964 | 10/1967 | United Kingdom . |

OTHER PUBLICATIONS

Stojanovic et al., Hemijska Industrija, vol. 33, No. 4 (1979).

Primary Examiner—Ronald W. Griffin
Attorney, Agent, or Firm—Leydig, Voit & Mayer

[57] ABSTRACT

The invention pertains to a method for the production of bead dextran materials for gel chromatography.

The subject of the invention is a method for the production of bead dextran materials for gel chromatography, wherein dextran is, before or during the suspension process or in both stages, subjected to reduction in an alkaline solution, advantageously by the action of sodium borohydride, whereas the density of crosslinking is controlled above all by variation of the concentration of the initial dextran solution and the resulting gel may be optionally subjected to the additional crosslinking in a separate subsequent operation.

The procedure according to the invention provides the product of higher quality with a lower content of carboxylic groups and substantially facilitates the preparation of gels with a very high and a very low crosslink density.

10 Claims, No Drawings

METHOD FOR THE PRODUCTION OF BEAD DEXTRAN MATERIALS FOR GEL CHROMATOGRAPHY

BACKGROUND OF THE INVENTION

The invention pertains to a method for the production of bead dextran materials for gel chromatography and more particularly, to a method for preparing dextran materials where the crosslink density is controlled by the concentration of dextran within the mixture.

Several types of materials used in the field of gel chromatography. Materials based on dextran assume an important position among them and commercially supplied and have been commonly used already for more than 15 years. These materials consist of particles of a spherical shape and are supplied in a series, the members of which have defined properties of gradually varied quantity. A property of fundamental importance is, the crosslink density, which affects the size of pores and is manifested as the so called exclusion limit, i.e. the molecular mass of compounds which are unable to penetrate inside the particles. Swelling capacity, which is also related to crosslink density, is defined either as the water regain in ml of water in a centrifuged sample corresponding to 1 g of dry substance or as the bed volume, i.e. the volume occupied by 1 g of dry sample after swelling to equilibrium. The properties for commonly used and supplied gels covering a broad range of molecular masses are 700 to 200,000 for the exclusion limits, and in the range of 1 to 20 ml/g for the water regain.

Another important property of these materials is their chemical purity, in absence of ionic groups. For example, carboxylic groups will cause undesirable sorptions and thus reduce the efficiency of the separation in the gel chromatography.

The dextran gels are produced by methods well known in the art and protected by patents. The basic patent, Ger. (FRG) No. 1,292,883 (1969), application in Sweden 1958, describes application of crosslinked dextran gels formed in the reaction with 1-chloro-2,3-epoxypropane in bulk. The final gel is crushed, washed and classified on screens to obtain the required particle size consisting of particles with an irregular shape. According to the following patent, Brit. No. 974,054 (1964), application in Sweden 1961, bead dextran gels are prepared in a suspension process where particles of perfect spherical shape are formed. In a typical experiment, dextran is dissolved in water, a solution of sodium hydroxide is added and the mixture is dispersed in a suitable water-immiscible liquid, preferably toluene or dichloroethane, in the presence of a stabilizer. The particles are crosslinked by heating in the presence of a crosslinking agent and then the formed gel is isolated, washed, deswelled and dried. According to another analogous procedure, (D. Cvetković, B. Pekić, S. Jovanović: Hem. Ind. 33 (1979), 139), mineral oil is used as a dispersion medium. A further procedure (Brit. Pat. No. 1,087,964—1967) employs as a dispersion medium the excessive 1-chloro-2,3-epoxypropane, which acts as a cross-linking agent at the same time.

However, the above mentioned known procedures have certain disadvantages. The use of mineral oil cause difficulties in washing and purification of the product. In crosslinking with an excess of 1-chloro-2,3-epoxypropane, it is necessary to reduce the one-sided reaction giving rise to pendant glycidyl and glyceroyl groups. In addition, dextran used as the starting material regularly contains lactones in the amount of about 20 to 50 micromole per gram of dry substance. These lactones are hydrolyzed in an alkaline medium during preparation of the gel so that the resulting gel contains the corresponding amount of free carboxyls.

Another disadvantage of the described procedures is the difficulty in attaining the required crosslink density. It appears that in samples prepared under other constant conditions that the dependence of water regain on the ratio of reactants, i.e. of the amount of crosslinking agent to the amount of dextran, has a characteristic parabolic course. The data for dextran at the initial concentration of dextran 40%, given in the following table, may serve as an example.

| 1-chloro-2,3-epoxypropane g per 100 g dextran | 7.4 | 8.0 | 8.6 | 12.0 | 17.7 | 25.1 |
|---|---|---|---|---|---|---|
| water regain ml/g of dry substance | 13.3 | 10.9 | 8.7 | 5.6 | 3.6 | 3.3 |

It follows from the data that the said dependence is very steep in the region of low crosslinked gels (water regain 10 to 20 ml/g). Consequently, control of the suspension process is very sensitive to small incidental variations in the weight of charges, in keeping the temperature and stirring regime, and also in the quality of the starting material. Irreproducible results often occur in the crosslink density of the products. A batch is often spoiled, for example, by incomplete crosslinking after a standard reaction time, and the raw material is then depreciated in further processing.

Preparation according to the known processes is also connected with difficulties at the other side of the practical range of water regain, 1 to 1.5 ml/g. A large excess of 1-chloro-2,3-epoxypropane is not sufficient as such and it is necessary to work with highly concentrated dextran solutions, which causes technical obstacles. It is far from easy to prepare a solution of dextran with the concentration of 60 wt.-%. This requires special kneader equipment, dissolution and homogenization of the solution takes rather a long time, the energy consumption increases, and the quality of raw material can be lowered. The concentrated dextran solutions have a high viscosity which brings about further problem in their dispersion.

Surprisingly, it has been found that the above shortcomings can be overcome relatively easily by the method of this invention.

DESCRIPTION OF THE INVENTION

This invention relates to a method for the production of bead dextran materials for gel chromatography, wherein dextran is, before or during the suspension process or in both stages, reduced in an alkaline medium, preferbly with sodium borohydride. The density of crosslinking is controlled above all by varying the concentration of the initial dextran solution. The resulting gel may optionally undergo an additional cross-linking in a separate subsequent operation.

The invention employs the fact that carboxyls in the form of lactones may be easily reduced with sodium borohydride. It has been proved experimentally that this reaction is not hindered even in the complicated dispersion system and that the content of carboxyls is reduced in this way to between 2 and 6 micromole per gram of dry substance. Naturally, it is also possible to carry out the reduction before starting the suspension process in such a way that sodium borohydride and sodium hydroxide are added to dissolve the dextran. The suspension crosslinking is started first, after the reduction is completed. Also so called hydrogenated dextran may be used as the starting material, i.e. the material was reduced and isolated in advance. Also various combinations of the said procedures lead to the same result. For example, it is also possible to reduce a main portion in the first stage and to complete the reduction during the suspension crosslinking.

To control the crosslinking density in the region of low densities characterized with water regain ranging between 10 and 20 ml/g, it is advantageous to start with diluted solutions of dextran. It turned out that the ratio of crosslinking agent to dextran necessary to attain the same water regain strongly depends on the concentration of dextran in the initial solution. Thus, for example, the gel with water regain of 10 ml/g requires, in the initial solution with a dextran concentration of 40%, 8.6 g of 1-chloro-2,3-epoxypropane per 100 g of dextran. Whereas dextran concentrations of 30 and 25%, require 16 and, respectively, 27 g of 1-chloro-2,3-epoxypropane per 100 g of dextran. The application of solutions with a lower concentration of dextran thus corresponds to a steady region in the formerly described parabolic dependence, where a small change of starting conditions causes only a small variation in the quality of the product. In this way, the above said disadvantages are avoided and, in addition to this, the yield is somewhat increased by reducing the extractable portion. Also, the subsequent processing of product (washing, deswelling, and drying) is facilitated.

In the region of high density crosslinking, i.e. in the preparation of gels with water regain of 0.8 to 2 ml/g, the disadvantages of the known process are overcome by a two-step procedure. The gel of medium crosslinking density, which has water regain between 2 and 7 ml/g, is prepared first and then, in the following operation, it is dispersed again, subjected to additional crosslinking, isolated, washed, deswelled and dried. The advantage of this procedure consists in avoiding working with highly concentrated solutions of dextran. It also enables valorization of unsuccessful batches which did not render the expected water regain in the first step. In addition to this, the reaction in the second step has lower demands than that of the first step. Solid particles, already formed, do not tend to stick together, so that the stabilizers are unnecessary, and the process results in a more preferable ratio of the phases. Thorough washing of the product is carried out only once, namely after the second step.

The invention is further illustrated in several examples of performance without, however, limiting its scope by any means.

EXAMPLE 1

Dextran (100 g) was dissolved in a solution of 11.8 g of sodium hydroxide in 390 ml of degassed distilled water, 1 g of powdered sodium borohydride was added and the mixture was allowed to stand for 2 hours. Toluene (1000 ml) containing 30 g of poly(vinyl acetate) and 3 g of oleic acid was charged into a reactor provided with a heating jacket and an anchor stirrer. The solution of dextran was slowly added under stirring at 500 r.p.m. Then, the temperature was raised to 50° C. within 30 min, 59 g of 1-chloro-2,3-epoxypropane was added, and the mixture was further stirred at 50° C. for 16 hours. The mixture was cooled down and the product was separated by decantation, washed successively with toluene, ethanol and water, threetimes with each solvent, neutralized by titration with diluted sulfuric acid, and eventually washed twice with water. After deswelling in ethanol and draining, a bead dextran gel was obtained with a particle size of 50 to 300 $\mu$m and water regain 15 ml/g. The content of carboxylic groups determined by titration was 4.2 $\mu$mol/g.

EXAMPLE 2

Dextran (100 g) was worked out in the same way as in example 1. However, an additional 0.2 g of sodium borohydride was added to the reduced solution after two hours. The dextran was then dispersed and processed in the same way as in example 1, with the distinction that only 30 g of 1-chloro-2,3-epoxypropane was used. The dried bead gel had a particle size of 50 to 300 $\mu$m, a water regain of 22 ml/g and the content of carboxylic groups was 2.5 $\mu$mol/g.

EXAMPLE 3

Dextran (100 g) was dissolved in 150 ml of an aqueous solution containing 11.8 g of sodium hydroxide, 0.8 g of sodium borohydride was then added and the solution was dispersed in 500 ml of toluene with 10 g of dissolved poly(vinyl acetate). After one hour, 25 g of 1-chloro-2,3-epoxypropane was added to the stirred mixture at 50° C. Further procedure was the same as in example 1. The dry bead gel had a particle size of 100 to 1000 $\mu$m, a water regain of 3.3 ml/g and the content of carboxylic groups was 3.5 $\mu$mol/g.

EXAMPLE 4

The preparation was carried out analogously to example 3, but dextran, reduced in advance was used. To dissolve 100 g of dextran, 11.8 of sodium hydroxide in 140 ml of water was used and the solution was dispersed in 500 ml of toluene with 10 g of poly(vinyl acetate) and 1 g of oleic acid added. After 30 minutes at 50° C., 25 g of 1-chloro-2,3-epoxypropane was added. Using the procedure described n example 1, dry bead gel was obtained which had the particle size of 50 to 600 $\mu$m, a water regain of 3.4 ml/g, and the content of carboxylic groups was 5.0 $\mu$mol/g.

EXAMPLE 5

Dextran (100 g), which was reduced in advance, was dissolved in a solution of 22 g of sodium hydroxide in 380 ml of degassed distilled water. Toluene (1 liter), containing 30 g of poly(vinyl acetate) and 3 g of oleic acid, was used for dispersion and 41 g of 1-chloro-2,3-epoxypropane was used for crosslinking. The procedure was carried out analogously to example 1. The bead gel had particles of a perfectly spherical shape and size of 100 to 500 $\mu$m, a water regain of 9.5 ml/g, and the content of carboxylic groups was 5.5 $\mu$mol/g.

EXAMPLE 6

The experiment was carried out analogously to example 5 with the distinction that the initial dextran solution had lower concentration. To dissolve 100 g of dextran, a solution of 22 g of sodium hydroxide in 540 ml of water was used. Other initial values and the procedure remained the same as in example 5. The dry bead gel had a particle size of 50 to 300 $\mu$m, a water regain of 23 ml/g and the content of carboxylic groups was 6 $\mu$mol/g.

EXAMPLE 7

Dextran (100 g), which was reduced in advance, was worked out in the same way as in example 4. After stopping the heating, the suspension was decanted three times with toluene and threetimes with ethanol. The excess of ethanol was removed by suction and the residual part was evaporated in a vacuum. The dry primary gel was dispersed in 300 ml of toluene, which contained 0.5 g of p-dodecylbenzenesulfonic acid. Then, 81 ml of 20% sodium hydroxide was added to the mixture. After 1 hour, 52 g of 1-chloro-2,3-epoxypropane was added to the mixture. The mixture was stirred at 50° C. for 16 hours, cooled down, separated by suction, washed with ethanol and water to a neutral reaction, deswelled in ethanol and dried. The product had a particle size of 50 to 300 μm, a water regain of 1.1 ml/g, and the content of carboxylic groups was 5.5 μmol/g.

EXAMPLE 8

The experiment was carried out analogously to example 7, with the distinction that 51 ml of 35% sodium hydroxide was added to the dispersion of primary gel in the additional cross-linking and the amount of 1-chloro-2,3-epoxypropane was 67 g. The dried product had a particle size of 50 to 300 μm, a water regain of 0.8 ml/g, and the content of carboxylic groups was 6.5 μmol/g.

We claim:

1. In a method for performing gel chromatography, the improvement comprising employing as the chromatographic medium, bead dextran material made by a process consisting essentially of reducing dextran in an alkaline medium containing sodium borohydride, suspending an aqueous solution of the dextran in an immiscible liquid and subsequently cross-linking the dextran in suspension to a desired degree, with a cross-linking agent.

2. The method of claim 1 wherein the concentration of the dextran in the aqueous solution was adjusted to achieve the desired degree of cross-linking.

3. The method of claim 1 wherein the dextran was reduced with sodium borohydride before the suspension step and the concentration of the dextran in the aqueous solution was adjusted to achieve the desired degree of cross-linking.

4. The method of claim 3 wherein the reduced dextran was isolated and dried prior to the suspension step.

5. The method of claim 3 wherein the dextran was not isolated after the reduction step.

6. The method of claim 1 wherein the dextran was reduced in substantial measure before the suspension step and the reduction of the dextran was completed during the suspension cross-linking.

7. The method of claim 1 wherein dextran gels with water regain ranging from 10 to 20 ml/mg were prepared from dextran solutions having a concentration from 5 to 20 weight percent.

8. The method of claim 1 wherein the bead dextran was prepared by a process also comprising the steps of washing the cross-linked dextran and subsequently dispersing the washed cross-linked dextran in a swelled state and additionally cross-linking the dispersed dextran.

9. The method of claim 8 wherein the dextran gel which was obtained after the additional cross-linking had a water regain ranging from 0.8 to 2 ml/g.

10. The method of claim 9 wherein the water regain of the dextran gel prior to the addition of the cross-linking agent ranged from 2 to 7 ml/g.

* * * * *